United States Patent
Shapiro et al.

(10) Patent No.: US 8,553,365 B1
(45) Date of Patent: Oct. 8, 2013

(54) APPARATUSES AND METHODS FOR LOADING A HEAD ONTO A DISK MEDIUM

(75) Inventors: Eugene Shapiro, Belmont, CA (US); Jagdeep S. Buttar, Saratoga, CA (US); Trung Vinh, San Jose, CA (US); Tahir A. Ali, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/401,751

(22) Filed: Feb. 21, 2012

(51) Int. Cl.
*G11B 5/54* (2006.01)
*G11B 21/22* (2006.01)

(52) U.S. Cl.
USPC .................. 360/254.3; 360/254.4; 360/254.5; 360/255.2; 360/255.3; 360/255.4; 324/212

(58) Field of Classification Search
USPC .... 360/254.3–254.6, 255.2–255.5; 73/865.6; 324/212
See application file for complete search history.

(56) References Cited

U.S. PATENT DOCUMENTS

| | | | | |
|---|---|---|---|---|
| 4,811,144 A * | 3/1989 | Miller et al. | | 360/267.6 |
| 5,023,737 A * | 6/1991 | Yaeger | | 360/254.5 |
| 5,274,519 A * | 12/1993 | Saito et al. | | 360/254.3 |
| 5,339,702 A | 8/1994 | Viches | | |
| 5,831,795 A * | 11/1998 | Ma et al. | | 360/254.3 |
| 5,870,255 A * | 2/1999 | Hornung et al. | | 360/254.4 |
| 6,212,045 B1 | 4/2001 | Guzik | | |
| 6,373,243 B1 * | 4/2002 | Takano et al. | | 324/212 |
| 6,570,741 B2 * | 5/2003 | Yamanouchi | | 360/254.4 |

* cited by examiner

*Primary Examiner* — Will J Klimowicz

(57) ABSTRACT

Systems and methods for improving loading and unloading of a read or write head onto and off of a disk medium. Particular embodiments may assist in loading a read or write head to, or unloading a read or write head from, a load location over a surface of a disk medium in such a manner that damage to the surface of the disk medium (e.g., load location) is either prevented or minimized. The prevention or reduction of damage may be achieved by ensuring that a read or write head has sufficient clearance over the surface of a disk medium as the read or write head moves over the surface (e.g., as the head moves parallel to the surface) during a head loading or unloading process.

12 Claims, 5 Drawing Sheets

APPARATUSES AND METHODS FOR LOADING A HEAD ONTO A DISK MEDIUM

TECHNICAL FIELD

Invention(s) described herein relate to read or write heads and disk media, and, more specifically, to apparatuses and methods for improving the loading and unloading of a read or write head onto and off of a disk medium.

BACKGROUND

Spinstands are used for multiple purposes with respect to disk drives, including characterization, testing, and development of (read-write) heads and disk media, particularly magnetic heads and magnetic disk media.

In order to perform such operations, spinstands require accurate and precise positioning of a read or write head (e.g., via a head positioning mechanism) at various track offsets for the purposes of reading and writing to disk media. Additionally, spinstands typically utilize a mechanism for loading and unloading the read or write head onto and off disk media.

Usually, the read or write head is part of a magnetic head-gimbals assembly (HGA), which is loaded onto magnetic disk during testing and unloaded thereafter. Some mechanisms load and unload the HGA by providing flexion suspension of the HGA in horizontal position using a support lift tab that is coupled to the HGA. Other mechanisms load and unload the HGA using a pivot point fixture that moves the HGA on and off the disk medium surface. Such loading/unloading mechanisms support operations for a wide range of positioning on the disk medium surface.

Additional mechanisms may utilize a static ramp loading mechanism, which uses a constant loading-unloading point (i.e., loading zone) on the disk medium surface. However, after a certain number of iterations, the use of the static ramp loader can result in a damaged disk medium surface at the loading zone.

BRIEF DESCRIPTION OF THE DRAWINGS

The present invention is illustrated by way of example, and not limitation, in the figures of the accompanying drawings. With respect to the figures.

DETAILED DESCRIPTION

Figure 1:
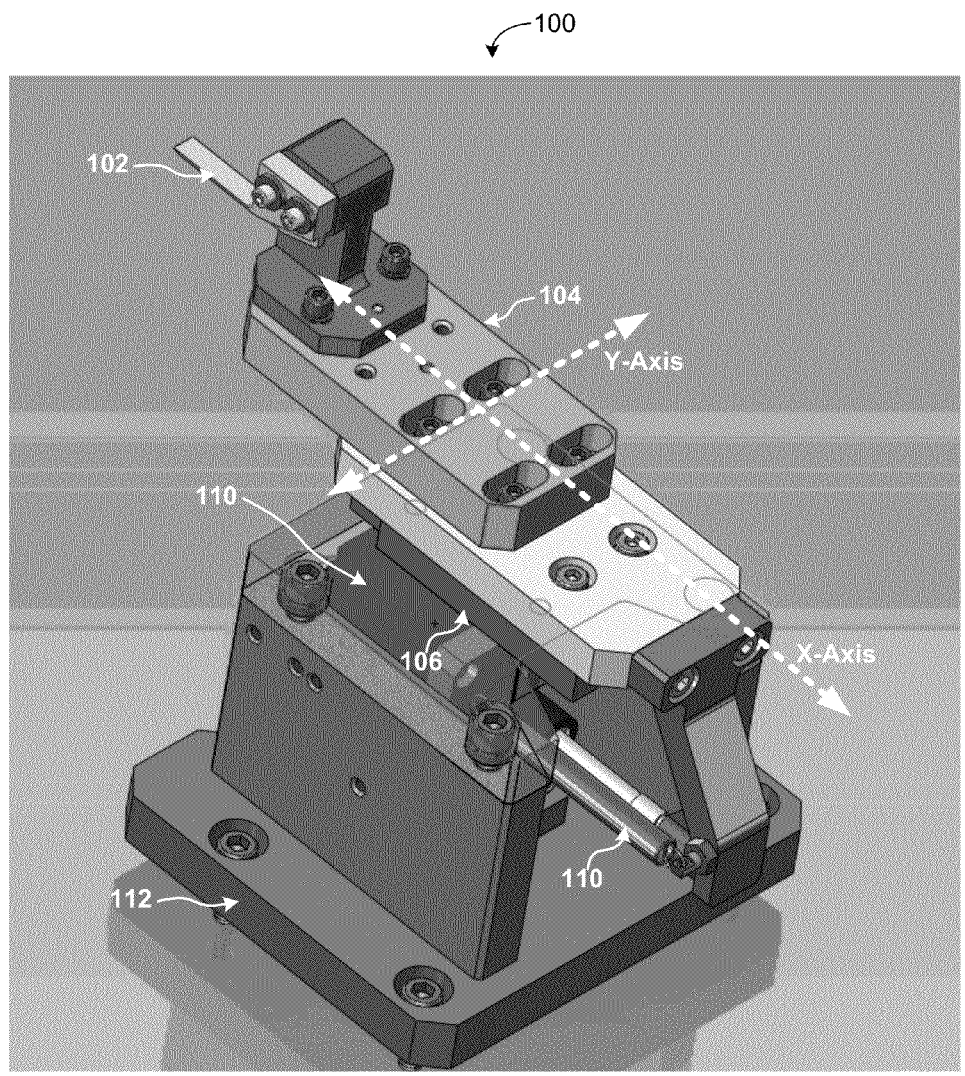
FIG. 1 is a diagram illustrating an exemplary head loading mechanism assembly in accordance with some embodiments of the present invention.

In the following description, numerous specific details are set forth to provide a thorough understanding of various embodiments of the present invention. It will be apparent however, to one skilled in the art that these specific details need not be employed to practice various embodiments of the present invention. In some instances, well known components or methods have not been described in detail to avoid unnecessarily obscuring various embodiments of the present invention.

Embodiments of the present invention provide for apparatuses and methods for improving loading and unloading of a read or write head onto and off of a disk medium. In particular, various embodiments may assist in loading a read or write head to, or unloading a read or write head from, a load location over a surface of a disk medium in such a manner that damage to the surface of the disk medium (e.g., load location) is either prevented or minimized. Additionally, various embodiments may change the location at which the head is loaded to the surface of the disk medium (i.e., change the load location) between loading and unloading iterations. In doing so, certain embodiments may reduce the chance that a head once loaded to the surface of the disk medium will encounter and sustain damage from a location on the surface of disk medium having damage from a previous load process. It should be noted that various embodiments may be configured to perform the head loading or unloading processes discussed herein with respect to the "top" surface of the disk medium, the "bottom" surface of the disk medium, or both.

Depending on the embodiment, the prevention or reduction of surface to the disk medium damage may be achieved by ensuring that a read or write head has sufficient clearance over the surface of a disk medium as the read or write head moves over the surface (e.g., as the head moves parallel to the surface) during a load or unload process, especially during multiple loading/unloading processes at the same location of the surface. Embodiments may provide a head such sufficient clearance over a surface of a disk medium by lifting or raising the head perpendicularly with respect to the surface, and maintaining the head in a lifted/raised state as the head is moved over the surface of the disk medium. With the prevention or minimization of surface damage to a disk medium, embodiments may extend the time in which the disk medium needs replacing, thereby extending the life of a disk medium (i.e., extract more use out of a given disk medium). This can have a direct impact on test the reusability of a given disk medium and a reduction in test costs, especially where an embodiment involves a spinstand.

Additionally, as noted above, some embodiments may prevent damage to the head by variably changing the position of the head loading mechanism between head loading and unloading iterations. For various embodiments, the change in position of the head loading mechanism results in a change in the location to which the head loading mechanism assists the head during a load process. In some embodiments, the position of the head loading mechanism may also be changed between load process and an unload process, in order to reduce the chance of damage to the surface of the disk medium or the chance of damage to the head.

Some embodiments include an apparatus for loading a head onto a disk medium comprising a head positioning mechanism configured to move (e.g., position or reposition) the head over the surface of the disk medium, and a head loading mechanism configured to assist in loading the head to a load location (also referred to herein as a "load position") over the surface of the disk medium. The head positioning mechanism may move the head from a position off the surface of the disk medium, to a position over the surface of the disk medium. The head loading mechanism may assist as the head positioning mechanism moves the head from the position off the surface to the position over the surface. After the head is loaded onto the disk medium, the head loading mechanism may move from a first load position to a second load position after the head is loaded onto the disk medium, thereby changing the load location to another load location. For particular embodiments, the head may be part of a head-gimbals assembly, and the apparatus may be part of a spinstand (e.g., used for testing magnetic disk medium, or testing a magnetic read or write head).

Additionally, some embodiments include a method for loading a head onto a disk medium comprising moving a head loading mechanism to a first load position such that at the first load position, the head loading mechanism can assist in loading the head to a first load location over the surface of the disk medium. The method may further comprise moving the head from the first position off the surface to the first position over the surface, and guiding the head to the first load location by the head loading mechanism (i.e., using the head loading mechanism) as the head moves from the first position off the surface to the first position over the surface. The method may further comprise moving the head loading mechanism to a second load position such that at the second load position, the head loading mechanism loads the head to a second load location over the surface as the head is moved from a second position off the surface of the disk medium to a second position over the surface of the disk medium.

FIG. 1 is a diagram illustrating an exemplary head loading mechanism assembly 100 in accordance with some embodiments of the present invention. As shown, the loading mechanism assembly 100 comprises a ramp loader 102, an axis crossbar 104, a linear slider 106, a linear actuator 110, and a base 112.

In some embodiments, the ramp loader 102 is configured to assist in loading a read or write head over a surface of a disk medium from a location off of the surface of the disk medium. Additionally, in some embodiments, the ramp loader 102 is configured to assist in unloading a read or write head from over a surface of a disk medium to a location off of the surface of the disk medium. For example, during the loading process or unloading process, the ramp loader 102 may provide assistance by displacing the head away from the surface of the disk medium as the head moves over the surface. Specifically, the ramp loader 102 may initially displace the head. from a first elevation with respect to the plane of the surface to a second elevation with respect to the plane of the surface, when the head is positioned off the surface of the disk medium. Subsequently, the ramp loader 102 may restore the head from the second elevation to the first elevation when the head is at or near a load position over the surface (e.g., desired data track of the disk medium).

The ramp loader 102 may comprise a sliding surface along which the head slides as the head is positioned (i.e., moved) by a head positioning assembly/mechanism (e.g., as the head is moved between a position off the surface of the disk medium and a position over the surface of the disk medium). In order to facilitate engagement and displacement of the head, the sliding surface may comprise a first ramp disposed at a first end of the sliding surface configured to receive the head onto the sliding surface as the head is being moved from a position off the surface of the disk medium to a position over the surface of the disk medium (e.g., during a head load process). The sliding surface may further comprise a second ramp disposed at a second end of the sliding surface, opposite the first end, configured to release the head from the sliding surface (i.e., allowing the head to slide off the sliding surface) as the head is being moved from a position off the surface of the disk medium to a position over the surface of the disk medium (e.g., during a head load process). During a head unload process, the roles of the first and second ramp may reverse, with the first ramp being further configured to release the head from the sliding surface and the second ramp being further configured to receive the head onto the sliding surface, as the head is being moved from a position over the surface of the disk medium to a position off the surface of the disk medium.

The slope of the first ramp and the slope of the second ramp may be configured to slide underneath or slide over a structural feature of the head (e.g., a tab) as the head and the ramp loader 102 move relative to one another, thereby facilitating engagement of the head with the sliding surface and facilitating elevation displacement of the head with respect to the surface of the disk medium. Those skilled in the art will appreciate that the slope of the first ramp and the slope of the second ramp are not necessarily the same and may vary among embodiments.

Disposed between the first ramp and the second ramp, the sliding surface may further comprise a level portion, along which the head slides, during a head loading or unloading process, as the head moves between a position off the surface of the disk medium and a position over the surface of the disk medium. For some embodiments, the level portion may be configured to substantially maintain a displacement of the head caused by either the first ramp or the second ramp as the head transitions from between the first ramp and the second ramp. Those skilled in the art will appreciate that the level portion may be only be substantially level and may, in some embodiments, comprise a gradual slope that assists in the displacement of the head as the head slides along the sliding surface of the ramp loader 102.

Depending on the embodiment, the ramp loader 102 may engage and displace the head by keeping the head stationary and moving the ramp loader 102 so that the ramp loader 102 slides underneath or over the head (e.g., using the linear actuator 110). Alternatively, the ramp loader 102 may engage and displace the head by keeping the ramp loader 102 stationary and moving the head (e.g., by way of a head positioning assembly/mechanism) such that is slides onto or underneath the ramp loader 102).

The ramp loader 102 may displace the head such that there is sufficient distance between the head and the surface as the head positioning mechanism moves the head over the surface from a position off the surface to a position over the surface. Generally, during a load process, the ramp loader 102 slides underneath or above the head (i.e., engages the head) while the head is positioned off the surface of the disk medium (e.g., by a head position mechanism). Subsequently, during an unload process, the head slides off the ramp loader 102. Those skilled in the art will appreciate that the ramp loader 102 may provide the head further lift by repositioning itself with respect to the surface of the disk medium.

In various embodiments, the ramp loader 102 is mounted to the axis crossbar 104, which is mounted to the linear slider 106. The axis crossbar 104 may permit adjustment of the ramp loader 102 along a particular axis relative to the head loading mechanism assembly 100. For instance, the axis crossbar 104 may allow a lateral repositioning of the ramp loader 102 (i.e., along the Y-axis) in order to adjust the ramp loader 102's position with respect to the head, the disk medium, or both. For some embodiments, adjusting the axis crossbar 104 may entail loosening fasteners configured to couple the axis crossbar 104 to the linear slider 106 or configured to couple the ramp loader 102 to the axis crossbar 104. Those skilled in the art would appreciate that for certain embodiments, the adjustment of the axis crossbar 104 may be facilitated through other means (e.g., mechanical means such as another actuator), which may be electronically controlled.

For some embodiments, the linear slider 106 facilitates movement of the ramp loader 102 relative to the head and the disk medium (neither of which are shown). The linear slider 106 may be coupled to the ramp loader 102 such that movement of the linear slider 106 along an axis (e.g., X-axis or Y-axis) results in relative movement of the ramp loader 102. For example, to enable assistance by the ramp loader 102 during a head loading or unloading process, the linear slider 106 may be configured such that movement of the linear slider 106 along the X-axis results in movement of the ramp loader 102 along the X-axis. Depending on the embodiment, movement by way of the linear slider 106 may cause some or all of the ramp loader 102 to move over the surface of the disk medium, thereby facilitating positioning of the ramp loader 102 over the surface of the disk medium (not shown). Once positioned, the ramp loader 102 may assist the head load to or unload from the surface of the disk medium as the head moves from a position off the surface of the disk medium, a position over a surface of the disk medium. In particular embodiments, the head may slide across the ramp of the ramp loader 102 as the head moves from a position off the surface of the disk medium, a position over a surface of the disk medium.

The movement of ramp loader 102 may be along the radius of the disk medium (i.e., move radially inward or outward with respect to the surface of the disk medium), thereby enabling the ramp loader 102 to assist in loading or unloading the head to or from a select diameter (e.g., inner, middle, or outer diameter) of the disk medium. Generally, the diameter of the disk medium corresponds to a track of the disk medium capable of storing data.

By engaging and displacing the head, and maintaining the displacement of the head as the head moves over or off of the surface of a disk medium, some embodiments ensure that any flexion or compression of the head (e.g., resulting from the head positioning mechanism/assembly) is prevented or mitigated as the head moves over the surface of the disk medium during a head load or unload process, thereby avoiding or mitigating damage to that surface.

Movement of the linear slider 106 (e.g., along the X-axis) may be facilitated by the linear actuator 110. For example, the linear actuator 110 may cause the linear slider 106 to slide relative to the base 112, along the X-axis, whereby movement of the linear slider 106 positions the ramp loader 102 to assist in the loading or unloading of the head. The linear actuator 110 utilized may be any one of several types of actuators known in the art. Examples of the linear actuator 110 include, without limitation, electric actuators, hydraulic actuators, and pneumatic actuators, which may be utilized in the manufacturing or development of disk drives. Depending on the embodiment, the linear actuator 110 may be automatically controlled by way of computer software operating on a computer system (e.g., computer system controlling a spinstand utilizing the loading mechanism assembly 100), or through manual control by a human operator (e.g., person utilizing a spinstand utilizing the loading mechanism assembly 100).

Through the base 112, the loading mechanism assembly 100 may be mounted to a tool or device utilized in the manufacturing or development of a disk drive component. For example, the base 112 may allow the loading mechanism assembly 100 to mount to a spinstand, which as noted herein, are used for multiple purposes with respect to disk drives, including characterization, testing, and development of (read-write) heads and disk media.

Those of skilled in the art will appreciate that the one or more components of the loading mechanism assembly 100 may be constructed from materials typically used in the construction of disk drive component tools, such as a spinstand.

Figure 2A:
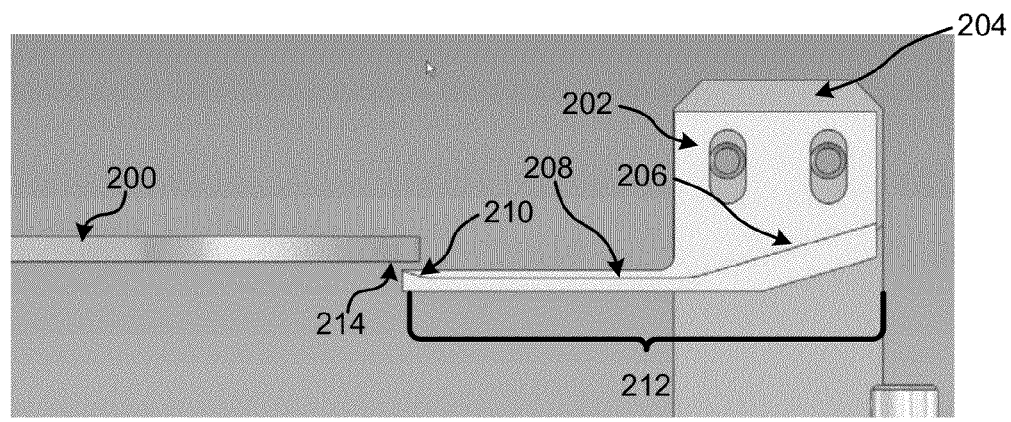
FIGS. 2A and 2B are diagrams illustrating exemplary usage of an exemplary ramp loader, with a disk medium, in accordance with some embodiments of the present invention.
Figure 2B:
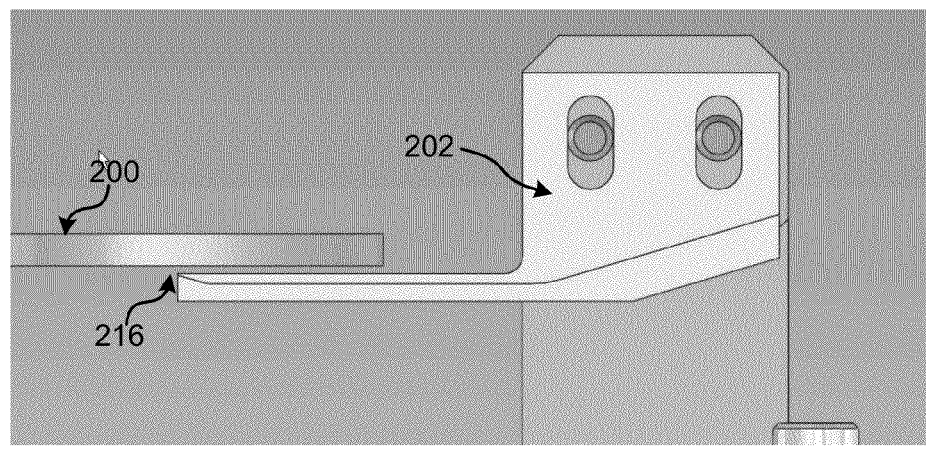

FIGS. 2A and 2B are diagrams illustrating exemplary usage of an exemplary ramp loader 202, with a disk medium 200, in accordance with some embodiments of the present invention. In FIG. 2A, the ramp loader 202 is positioned, relative to the disk medium 200, for loading or unloading of a head to and from a load/unload location 214 of the disk medium 200. The load/unload location represents an outer diameter track of the disk medium 200. In FIG. 2B, the ramp loader 202 is positioned, relative to the disk medium 200, for loading or unloading of a head to and from a load/unload location 216 of the disk medium 200. The load/unload location represents an inner or middle diameter track of the disk medium 200.

In FIG. 2A, the ramp loader 202 is coupled to a mount 204, which according to some embodiment, may be coupled to a loading mechanism assembly configured to assist in the loading or unloading of a head to and from a surface of the disk medium 200.

As noted herein, in order to facilitate engagement and displacement of the head, the ramp loader 202 may comprise a sliding surface 212 along which the head slides as the head is positioned (i.e., moved) by a head positioning assembly/mechanism (e.g., as the head is moved between a position off the surface of the disk medium and a position over the surface of the disk medium). As also noted herein, the sliding surface 212 may comprise a first ramp 206 and a second ramp 210 having a slope configured to slide underneath or sliding over a structural feature of the head (e.g., a tab), thereby facilitating elevation displacement of the head with respect to the surface of the disk medium 200. The ramp loader 202 may further comprise a level portion 208 disposed between the first ramp 206 and the second ramp 210, along which the head slides as the head moves between a position off the surface of the disk medium and a position over the surface of the disk medium 200.

To adjust the vertical positioning of the ramp loader 202 with respect to the disk medium 200, the ramp loader 202 may be coupled to the mount 204 using fasteners, which facilitate manual repositioning of the ramp loader 202 with respect to the mount 204. Those skilled in the art would appreciate that for certain embodiments, the vertical repositioning of the ramp loader 202 with respect to the disk medium may be facilitated through other means (e.g., mechanical means), which may cause the ramp loader 202 to reposition itself with respect to the mount 204, or which may cause the mount 204 to reposition itself with respect to the disk medium 200.

Figure 3:
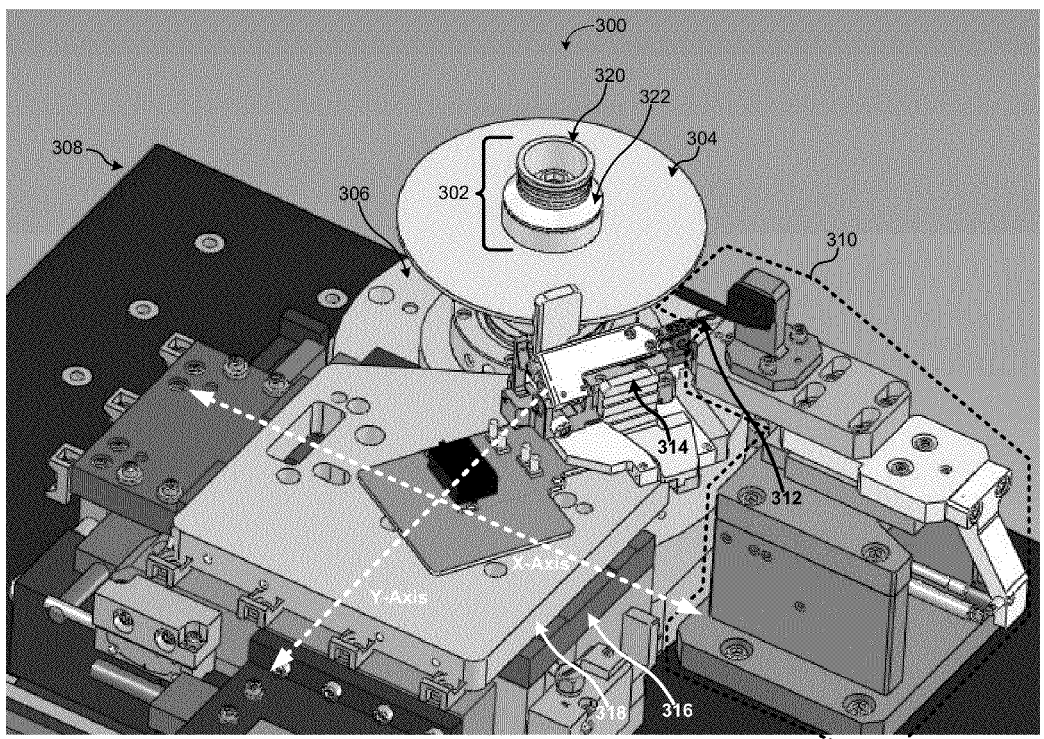
FIG. 3 is a diagram illustrating an exemplary spinstand assembly in accordance with some embodiments of the present invention.

FIG. 3 is a diagram illustrating an exemplary spinstand assembly 300 in accordance with some embodiments of the present invention. The spinstand assembly 300 comprises a clamp mechanism 302, a disk medium 304, a spindle motor 306, a base 308, a loading mechanism assembly 310, a head-gimbals assembly 312, a cartridge 314, a linear slider 316, and a head positioning mechanism 318. As described herein, the spinstand assembly 300 may be used in the manufacturing or development of magnetic disk medium or a magnetic read-write head. For some embodiments, the disk medium 304 may be a magnetic disk medium, configured to receive data via a magnetic write head, and store data for subsequent retrieval via a magnetic read head. The disk medium 304 may be mounted to and retained by the spinstand assembly 300 using the clamp mechanism 302, which may comprise a spindle 320 adapted to receive the disk medium 302 and a fastener 322 that secures the disk medium 302 to the spindle 320 (e.g., a threaded fastener configured to twist onto the spindle). The clamp mechanism 302 may be coupled to the spindle motor 306 to facilitate rotation of the disk medium 304 during operation of the spinstand assembly 300.

The head-gimbals assembly 312 may comprise a read or write head utilized in one or more operations of the spinstand assembly 300. The head-gimbals assembly 312 may be coupled to the spinstand assembly 300 through the cartridge 314, which couples the head-gimbals assembly 314 to the head positioning mechanism 318. Various embodiments utilize the head positioning mechanism 318 in positioning the head (of the head-gimbals assembly 312) over a surface of the disk medium 304. Movement of the head positioning mechanism 318 may be enabled through the linear slider 316, which may be adapted to slide relative to the remainder of the spinstand assembly 300. In various embodiments, the linear slider 316 may slide along the X-axis or Y-axis shown in FIG. 3.

As described herein, the loading mechanism assembly 310 may be configured to assist in the loading or unloading of the head-gimbals assembly 312. For some embodiments, the loading mechanism assembly 310 may be similar to that of the loading mechanism assembly 100, illustrated in FIG. 1.

Figure 4:
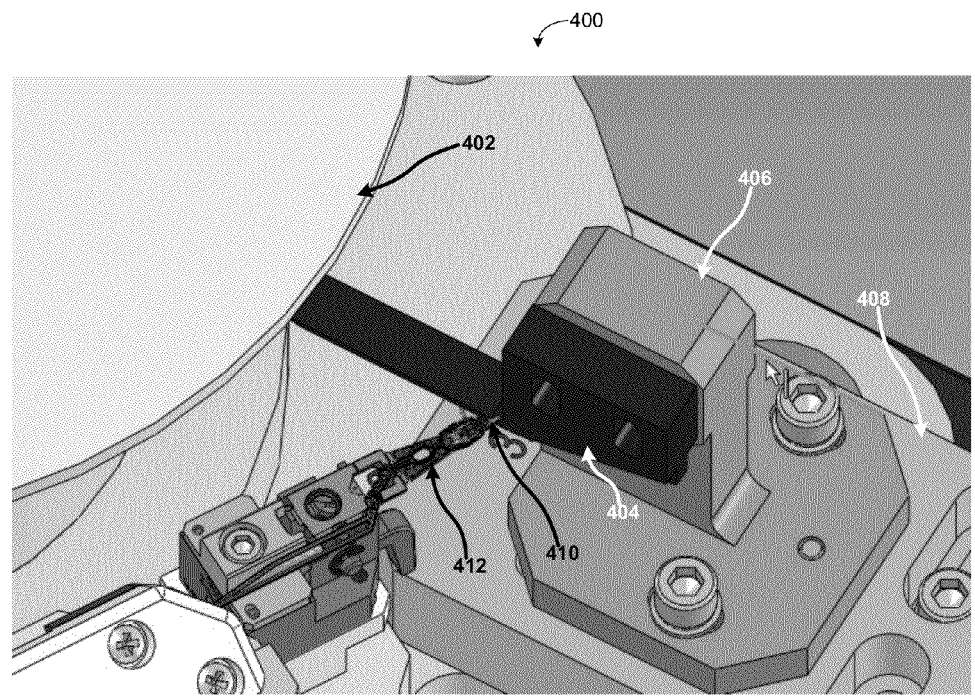
FIG. 4 is a diagram illustrating an exemplary head loading mechanism used, in accordance with some embodiments of the present invention, being used with a spinstand assembly.

FIG. 4 is a diagram illustrating an exemplary head loading mechanism used, in accordance with some embodiments of the present invention, being used with a spinstand assembly 400. The spinstand assembly 400 may comprise a disk medium 402, a ramp loader 404, a mount 406, an axis crossbar 408, and a head-gimbals assembly including a head 410. In some embodiments, the ramp loader 404 may be similar to the ramp loader 102 illustrated and described in FIG. 1 or similar to the ramp loader 202 illustrated and described in FIG. 2.

Figure 5:
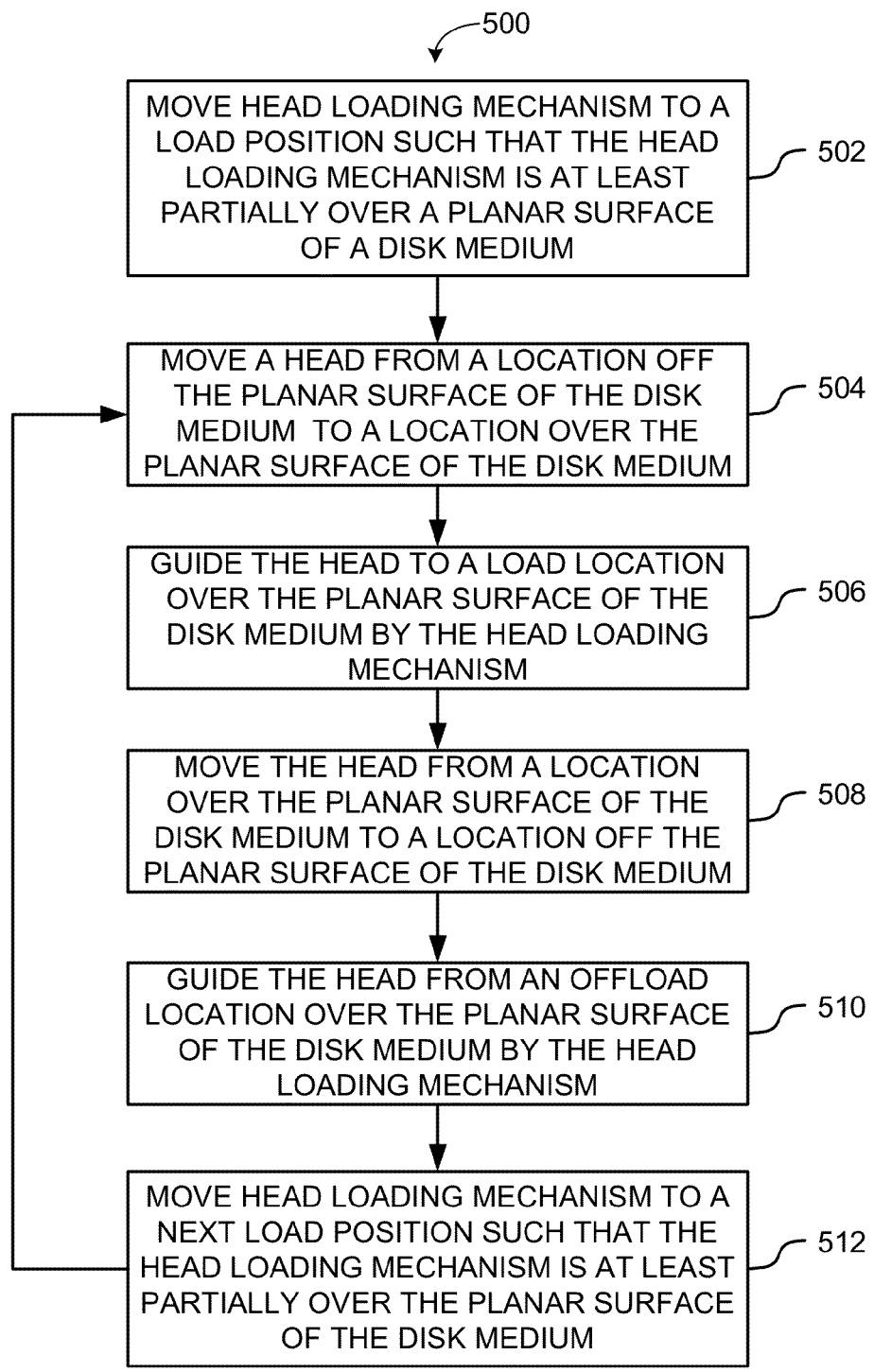
FIG. 5 is a flow chart illustrating an exemplary method of improving loading and unloading of a read or write head onto and off of a disk medium in accordance with some embodiments of the present invention.

FIG. 5 is a flow chart 500 illustrating an exemplary method of improving loading and unloading of a read or write head onto and off of a disk medium in accordance with some embodiments of the present invention. The method 500 begins at operation 502, where a head loading mechanism may be moved (i.e., positioned) to a load position such that the head loading mechanism is at least partially over a planar surface of a disk medium. In some embodiments, the head loading mechanism may be positioned using an actuator, configured to move the head loading mechanism radially inward or outward with respect to the surface of the disk medium. In accordance various embodiments (such as those described herein), the head loading mechanism, once positioned, can assist in loading to a load location over a planar surface of the disk medium, or unloading the head from a unload location over the planar surface of the disk medium.

At operation 504, a head (read, write, or both) may be moved from a location off the planar surface of the disk medium to a location over the planar surface of the disk medium. In certain embodiments, the head may be moved from the location off the planar surface of the disk medium to the location over the planar surface of the disk medium during a head loading process. During operation 506, as the head is moved from the location off the planar surface of the disk medium to the location over the planar surface of the disk medium, the head may be guided to a load location over the planar surface of the disk medium by way of the head loading mechanism.

At operation 508, the head may be moved from a location over the planar surface of the disk medium to a location off the planar surface of the disk medium. In particular embodiments, the head may be moved from the location over the planar surface of the disk medium to the location off the planar surface of the disk medium during a head unload process. During operation 510, as the head may be moved from the location over the planar surface of the disk medium to the location off the planar surface of the disk medium, the head may be guided from an unload location over the planar surface of the disk medium by way of the head loading mechanism. Operation 508 may be performed once the head has concluded a read operation or a write operation to the disk medium.

At operation 512, the head loading mechanism may be moved (i.e., positioned) to a next load position such that the head loading mechanism continues to be at least partially over the planar surface of a disk medium. The method 500 continues with operations 504 to 510. By positioning the head loading mechanism to the next load position, the head loading mechanism can assist in loading to a next load location over a planar surface of the disk medium, or unloading the head from a next unload location over the planar surface of the disk medium.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

What is claimed is:

1. An apparatus for loading a head onto a disk medium, comprising:
   a head positioning mechanism configured to move the head, wherein the head positioning mechanism moves the head from a position off the surface of the disk medium to a position over the surface of the disk medium when the head is being loaded onto the disk medium; and
   a head loading mechanism configured to assist in loading the head to a load location, over the surface of the disk medium, as the head positioning mechanism moves the head from the position off the surface to the position over the surface, wherein the head loading mechanism is further configured to move from a first load position to a second load position after the head is loaded onto the disk medium, and wherein moving the head loading mechanism from the first load position to the second load position results in the load location changing from a first location over an outer diameter of the surface to a second location over an inner diameter of the surface.

2. The apparatus of claim 1, wherein the head loading mechanism is configured to assist in loading the head to the load location such that the head avoids contact with the surface as the head positioning mechanism moves the head from the position off the surface to the position over the surface.

3. The apparatus of claim 1, wherein the inner diameter is closer to a target diameter of the surface than the outer diameter is to the target diameter.

4. The apparatus of claim 1, wherein the head loading mechanism is configured to assist in loading the head to the load location by:
- displacing the head from a first elevation with respect to the surface to a second elevation with respect to the surface, when the head is at or near the position off the surface, such that there is sufficient distance between the head and the surface as the head positioning mechanism moves the head over the surface from the position off the surface to the position over the surface;
- restoring the head to the second elevation when the head is at or near the position over the surface; and
- releasing the head from the head loading mechanism at the load position over the surface.

5. The apparatus of claim 4, wherein the head comprises a lift tab that enables the head loading mechanism to the displace and restore the head.

6. The apparatus of claim 1, wherein the head loading mechanism comprises a ramp configured to assist in loading the head to the load location, wherein the ramp has a slope along which the head slides as the head positioning mechanism moves the head between the position off the surface and the position over the surface, and wherein the slope is configured to displace the head away from the surface as the head positioning mechanism moves the head closer to the position off the surface and lower the head toward the surface as the head positioning mechanism moves the head closer to the position over the surface.

7. The apparatus of claim 6, wherein at the position over the surface, the head slides off the ramp.

8. The apparatus of claim 1, wherein the head loading mechanism is further configured to assist in unloading the head from an unload location over the surface of disk medium as the head positioning mechanism moves the head from a second position over the surface to a second position off of the surface.

9. The apparatus of claim 8, wherein the head loading mechanism is further configured to move from the first load position to a second load position after the head is loaded onto the disk medium and unloaded from the disk medium.

10. The apparatus of claim 8, wherein the head loading mechanism comprises a ramp configured to assist in unloading the head from the unload location, wherein the ramp has a slope along which the head slides as the head positioning mechanism moves the head between the second position over the surface and the second position off the surface, and wherein the slope is configured to lower the head toward the surface as the head positioning mechanism moves the head closer to the second position over the surface and displace the head away from the surface as the head positioning mechanism moves the head closer to the second position off the surface.

11. The apparatus of claim 1, wherein the apparatus is part of a spinstand.

12. The apparatus of claim 1, further comprising a spindle configured to hold the disk medium and to spin the disk medium while the head is over the surface of the disk medium.

* * * * *